United States Patent Office 3,355,259
Patented Nov. 28, 1967

3,355,259
PROCESS FOR MELTING SULFUR
Delbert A. Lipps, New Orleans, La., James D. Best, Freeport, Tex., and Paul A. Rubero, New Orleans, La., assignors to Freeport Sulphur Company, New York, N.Y., a corporation of Delaware
Filed Feb. 3, 1964, Ser. No. 342,148
3 Claims. (Cl. 23—293)

This invention relates to an improved method and apparatus for the melting of solid sulfur and the heating of the resulting liquid to temperatures above the melting point.

Sulfur is a solid at atmospheric temperatures, but is a liquid above 238° F. Its most important uses require elevated temperatures, and therefore that it be in the liquid state, although it is frequently received and stored in the solid state at atmospheric temperatures. For example, sulfur must be liquefied, heated and burned in the manufacture of sulfuric acid, of paper, and of certain chemicals. It must also be liquefied and heated for most of the purification processes which are applicable to it, e.g., sublimation for production of flowers of sulfur.

A widely used method of melting sulfur is to introduce the solid into a tank of liquid sulfur, kept heated somewhat above the melting point. Melting rate by this method is limited because it is not practical to heat the liquid sulfur above about 320° F. Above that temperature, the liquid becomes very viscous, reducing heat transfer rates. Furthermore, at high temperatures the crude sulfur of commerce deposits scale of carbonaceous material on the heating surfaces, insulating them, and seriously reducing their heat transfer rate. Because excessive temperature of the heating surfaces creates these difficulties, steam contained in coils is the usual, and most desirable heating medium since its temperature is readily controlled. Heating the coils by passing burner or flue gases through them is unsatisfactory because of the normally high temperature of these gases.

If, as is often the case, the solid sulfur contains moisture, this is converted to vapor during melting, and is entrapped in the liquid surrounding the solid, causing foaming and, possibly overflow. Agitation of the liquid in the tank, both reduces foaming and increases melting rate, greatly. But a mechanical agitator requires driving power and costly maintenance.

Another widely used method of melting sulfur is by direct contact of the solid with heated surfaces so shaped as to allow the liquid which forms to drain to a collection tank. This method overcomes the problems incurred in foaming and agitation of the liquid, but the temperature limitations apply, nevertheless.

It is an object of this invention to provide a new and improved method and apparatus for melting solid sulfur, and further heating the liquid so produced.

Another object is to provide a method and apparatus for melting solid sulfur, and heating the liquid so produced, at a high rate without using a mechanical agitator.

Another object is to provide a method and apparatus for melting moist, solid sulfur, and heating the liquid so produced with reduced foaming.

Another object is to provide a method and apparatus for melting solid sulfur, and heating the liquid so produced, which avoids heat-transfer surfaces with their inherent tendency to scale and corrode.

Another object is to provide a method and apparatus for melting solid sulfur, and heating the liquid so produced, which utilizes the efficient process of transferring heat directly from hot gases to the sulfur.

Other objects will be apparent to those skilled in the art from reading the present description, taken in conjunction with the appended drawings, in which.

Figure 1:
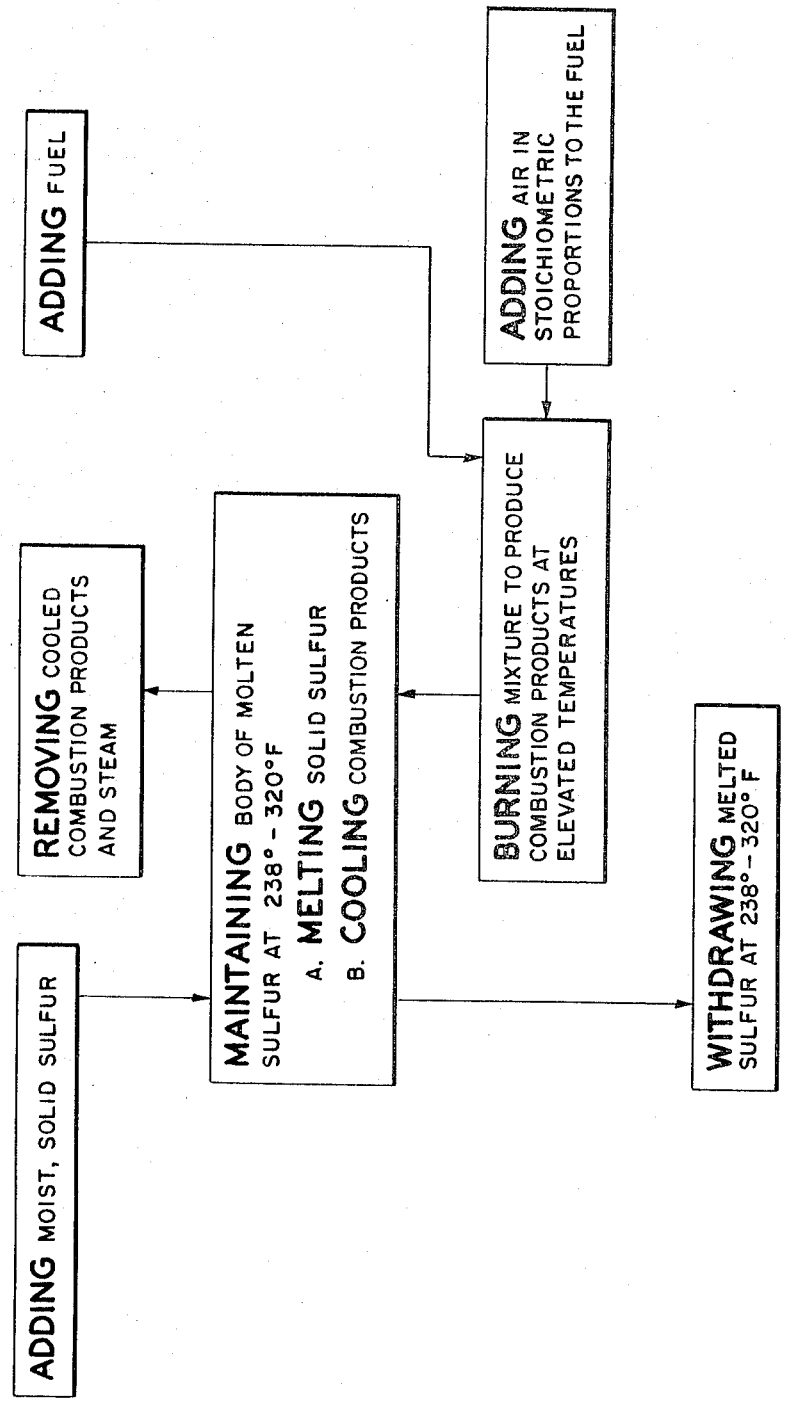
FIGURE 1 is a flow diagram of the process of this invention.

The objects of this invention are accomplished, as shown diagrammatically in FIGURE 1, by adding solid sulfur, which may contain moisture, to a body of molten sulfur which is maintained at a temperature between about 238° F. and 320° F. preferably between 270 and 300° F. The body of molten sulfur is heated by one or more submerged burners which burn air and fuel, preferably in stoichiometric amounts, in order to product hot combustion products. Gaseous, liquid or solid fuel, such as powdered coal, may be used in the practice of this invention. The hot combustion products are released below the surface level of the body of molten sulfur and cause an agitation and thorough mixing of the molten sulfur body. The combustion products exchange their heat directly with the body of molten sulfur without the use of a heat exchanger and are themselves cooled, preferably to about the temperature of the molten sulfur body, and evolve from the body of molten sulfur. The solid sulfur is melted by contact with the body of molten sulfur and thoroughly mixed with it by the agitating action of the submerged gases. Molten sulfur is desirably continuously removed at about the same rate at which solid sulfur is added. Some of the advantages of the use of the method and apparatus of this invention are: (1) control of the liquid sulfur temperature within a narrow range, (2) the agitation of the liquid sulfur by the gaseous combustion products bubbling through it so that mechanical agitation is unnecessary, (3) high fuel efficiency that is obtained by having the temperature of the combustion products closely approach the temperature of the melted sulfur before leaving the molten body, (4) improved thermal efficiency as compared with heat exchanger systems, (5) the elimination of the coating of heat exchanger surfaces by insoluble contaminants, (6) removal of moisture from the molten mixture, thus reducing foaming and corrosion, (7) the use of smaller size equipment and (8) the portability of the apparatus which may permit it to be used in a number of locations.

Figures 2, 3:
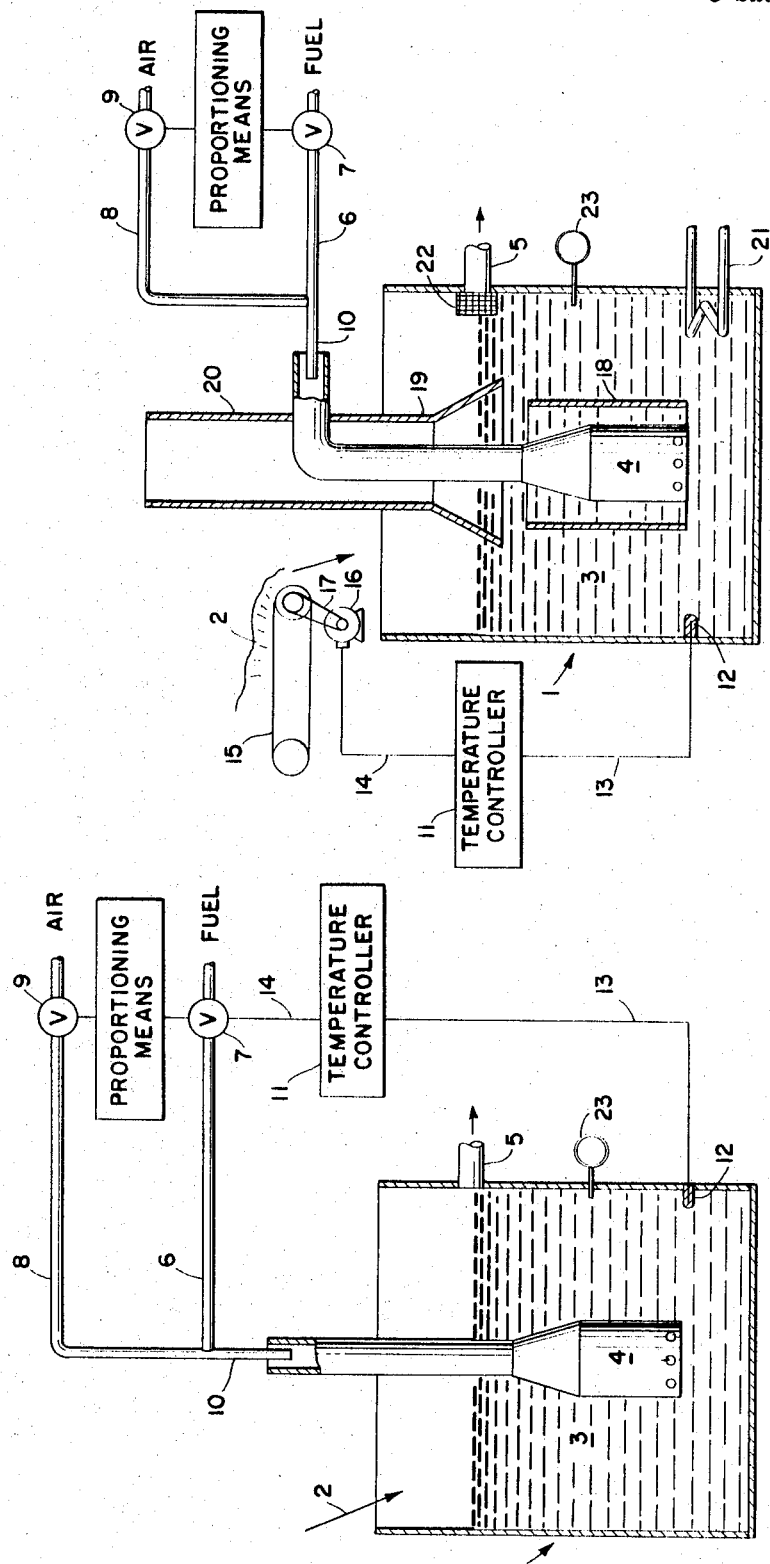
FIGURE 2 is a schematic view of one embodiment of the apparatus of this invention.
FIGURE 3 is a schematic view of another embodiment of the apparatus useful in practicing the present invention.
Figure 4:
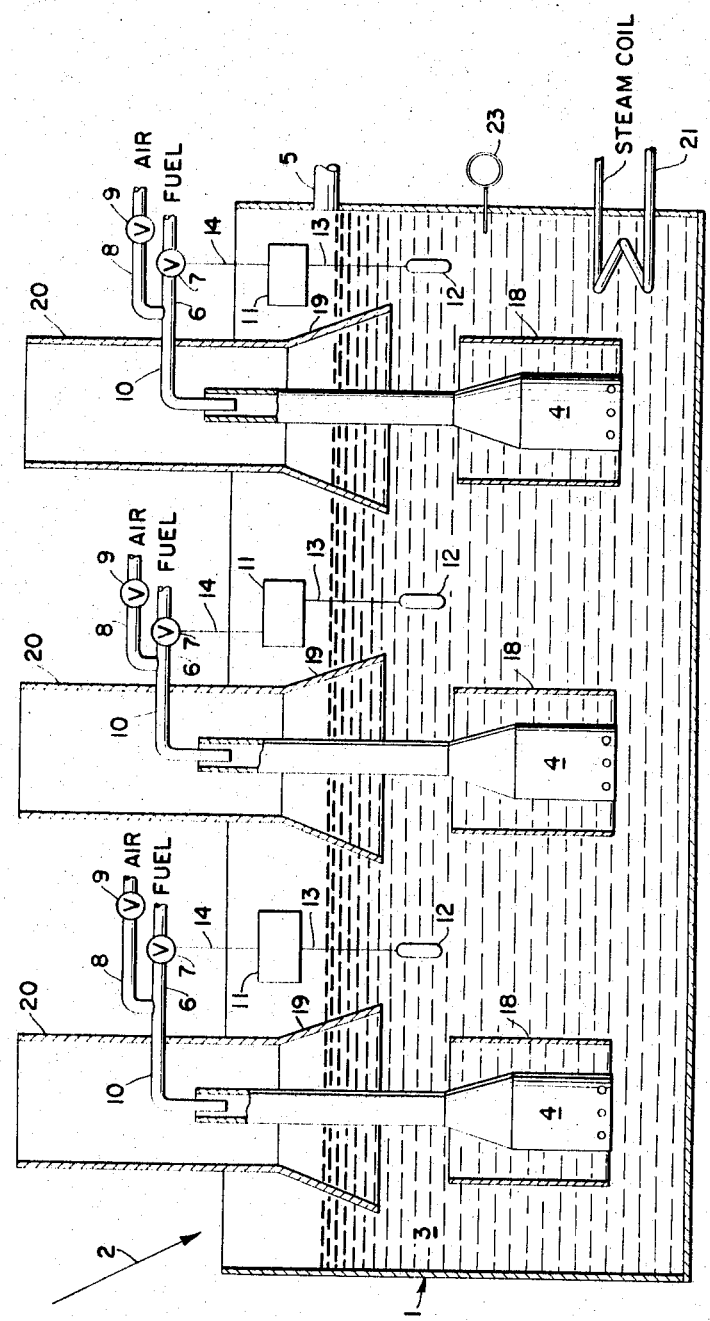
FIGURE 4 is a schematic view of an embodiment utilizing multiple submerged burners in the practice of this invention.

The method and apparatus of this invention may be practiced using either a single submerged burner as shown in FIGURES 2 and 3 or with multiple submerged burners as shown in FIGURE 4. The apparatus of the invention in its general form is illustrated in FIGURE 2. Tank 1 contains liquid sulfur 3 which is kept heated to a temperature between about 238° F. to 320° F. by one or more submerged burners 4. Solid sulfur 2, at atmospheric temperature, is fed into the liquid sulfur 3 at a point as near the point of burner gas release as possible. The hot liquid sulfur melts the solid. The accumulating liquid flows into conduit 5 at a rate substantially equal to that at which the solid is introduced. Conduit 5 is located at a point as far removed from the point at which the solid is introduced as possible. Conduit 5 conducts the liquid sulfur to its point of use or storage, as desired. As shown in FIGURE 3, a screen 22 or other scalping device may be placed at the entrance to conduit 5 if it is desired to limit the size of any solids in the melted discharge. Temperature gauge 23 indicates the temperature of the molten sulfur.

The term "submerged burner," as used herein, and as widely used in commerce, refers to a burner so designed that the hot products of the combustion are discharged beneath the surface of the liquid sulfur. The burner flame itself may be located either above or below the liquid surface, but if located above, the flame must be enclosed so as to force the hot combustion products to pass beneath the surface. A number of submerged burners are available commercially, and, in most of them, the flame is located above the surface of the liquid, but is enclosed within a tube which extends some distance below that surface. Fuel enters the submerged burner 4 through conduit 6, the flow rate being controlled by valve 7. Air enters the burner through conduit 8, the flow rate being controlled by valve 9.

The rate at which solid surfur can be melted depends, in large part, upon the average size of the lump of solid sulfur being fed and the temperature at which the liquid sulfur is maintained. The melting rate is greater with smaller average lump size of the solids being fed, and with increased temperature of the liquid. It may be desirable to crush the solid sulfur before feeding if it occurs in excessively large lumps. All lumps are preferably less than one-half inch in any dimension.

The temperature of the liquid sulfur is preferably controlled by the rate at which fuel and air are fed to the burners. The rate of feed of fuel and air to the burner 4 may be controlled manually by valves 7 and 9 in accordance with the indications of temperature indicator 23 or temperature controller 11 may be used to control valve 7 in well known manner, for instance by means of temperature sensing device 12 located in tank 1 and conduits or wires 13, 14, depending on the control system utilized, connecting the sensing device, controller and valve. Preferably valves 7 and 9 are made to operate in predetermined relationship to each other by well known means, for instance by mechanical linkage.

The heat produced by the burners is contained in the hot combustion gases, and it is transferred to the liquid by conduction, convection, and radiation directly from gas bubble to sulfur, without the intervention of any solid heat transfer surface.

Furthermore, as the gas bubbles rise through the liquid, they agitate the liquid violently. This action not only circulates the liquid so that its whole mass is heated uniformly, but it also maintains the unmelted solid uniformly suspended throughout the liquid and prevents its settling to the bottom. The rising gas bubbles also vaporize, and rapidly remove, moisture that may be contained in the feed sulfur, thereby minimizing any foaming of the liquid which ordinarily occurs during the melting of moist sulfur. Because the burners agitate the liquid violently, mechanical agitating devices are unnecessary.

By releasing the combustion gases from the burner at a sufficiently great depth in the liquid, the combustion gases, before leaving the liquid and discharging into the atmosphere, will be cooled almost to the temperature of the liquid. The utilization of the heat derived from the burning fuel is therefore used in a most efficient way. Although the depth at which the combustion gases must be released from the burners to attain this thorough cooling of them depends upon the construction of the burner and its size, it has been found that release at a depth of three feet below the surface of the liquid sulfur is generally adequate.

It is preferable to mix the fuel and air fed to the burners in stoichiometric proportion because too little air may result in conversion of some of the sulfur to hydrogen sulfide and too much air may consume some of the sulfur as sulfur dioxide. At the stoichiometric proportion, neither reaction with the sulfur occurs and sulfur losses are thus minimized. Furthermore, at stoichiometric proportion, the heat produced from the fuel can be most efficiently transferred to the sulfur.

The temperature range in which the liquid sulfur is desirably maintained (238° F. to 320° F.) is that within which the liquid neither tends to solidify nor become excessively viscous. Sulfur solidifies below 238° F. Above 320° F. the liquid becomes exceedingly viscous so that agitation is poor. In the preferred temperature range of 270° F. to 300° F., the liquid is not viscous, but is sufficiently above the melting point to cause rapid melting of the solids introduced. Also in this temperature range, the sulfur discharged from the treating vessel contains sufficient excess heat to permit ultimate melting of any small amount of unmelted solid that is entrained in the discharging liquid.

Solid sulfur may be fed into the tank either continuously, or intermittently, at spaced intervals of time. But, it is preferred to feed continuously because continuous feed results in the highest average melting rate for a unit of given size.

Advantageously the burners are located well away from any tank wall to avoid interference with agitation by the tank wall. It is preferred that the solid be fed as near the point of burner gas release as possible and that the outlet conduit be located as far from the point of introduction of the solids as possible.

The position of the burners is also subject to some variation. A vertical position for the burners is desirable because in the vertical position, the agitated liquid most effectively cools the burners tubes. Solid sulfur will be melted satisfactorily, however, with the burners positioned at an angle to the vertical, or horizontal, so long as they are submerged.

The preferred embodiment of the invention is illustrated in FIGURE 3. Tank 1 contains liquid sulfur 3 which is kept heated to a temperature in the range of 270° F. to 300° F. by one or more submerged burners 4. Solid sulfur 2 at atmospheric temperature is fed continuously into the liquid sulfur 3 near the burners by means of a belt conveyor 15 driven by motor 16 and pulley 17. The rate of addition of the solid sulfur may be controlled by the temperature of the molten sulfur, for instance, by means of temperature controller 11 connected to temperature sensing element 12 and motor 16 by wire or conduits 13 and 14. The addition of solid sulfur cools the body of molten sulfur. The accumulating liquid overflows into conduit 5 mounted at the liquid surface level in the tank, and on the side of the tank opposite the location of the belt conveyor. Conduit 5 conducts the liquid sulfur to its point of use or storage.

Each burner 4 is surrounded by a cylindrical draft tube 18 which directs the liquid circulation for maximum efficiency of agitation. A conical hood 19 surmounted by a stack 20 has its lower end slightly immersed in the liquid directly above the burner. The discharging combustion gases enter this hood and are conducted by the stack to an elevation at which release into the atmosphere is acceptable. Tank 1 also contains in its lower portion a steam coil 21. This coil is used during the start-up period to melt solid sulfur in the tank. An auxiliary melting method, such as coil 21, is advantageous during the start-up because a tank full of liquid sulfur must be provided before the submerged burner can be put into operation.

As shown in FIGURE 4 multiple burners may be utilized in the practice of this invention.

A feature of this invention is that melting of sulfur with submerged combustion equipment can be carried out at much higher thermal efficiency than can be attained with steam melting systems. With steam heating, as much as 40% of the b.t.u. value of the orginal fuel is lost in generation and transmission of the steam. Heat losses from a submerged combustion system can be held to less than 15% of fuel heat content, depending on the temperature of the gas discharge from the melting vessel. This factor is of great importance in installations where steam must be generated, especially for this purpose, my combustion of gaseous fuels.

Another feature of the submerged combustion sulfur melter over steam-heated melters is that it does away with the need for extensive steam coil surfaces. Steam-heated sulfur melters require from two- to six-square feet of steam coil surface per ton per day of melting capacity. Also, because in the submerged combustion melter, heat is transferred to the sulfur by direct contact with hot gases, there is no metallic heat transfer surface to foul or corrode. Considerable savings in agitation power requirements can be realized with the submerged combustion melter, because the combustion gases themselves provide the required agitation. Contaminants insoluble in molten sulfur do not interfere with the heat transfer rate. Where heat is transferred indirectly though pipe walls, solid contaminants can settle on the pipe wall and interfere with the heat transfer rate. Rising combustion gases assist in removing moisture from the solid-molten surface mixture, which reduces foaming and corrosion. Smaller equipment is needed for submerged combustion melters than for melters using steam coils. Large heat transfer surface areas are required for indirect heating methods and these physically require a volume much greater than this process in which direct heat transfer occurs. The submerged combustion melter is more mobile than steam type melters. Steam may not be available for melting in certain locations. On the other hand, fuels are generally available.

*Example I*

This example employs a laboratory submerged combustion burner similar to that of FIGURE 2 and employing manual means of temperature control to demonstrate the use of the submerged combustion process for melting sulfur. An open five gallon container equipped with an overflow line is used as the melting chamber. The container is filled with liquid sulfur and the lighted burner is placed in the container. The temperature of the sulfur pool is regulated between 238 and 320° F. by frequent additions of solid sulfur. Solid sulfur containing moisture is added to note the effect of water on the melting operation. Melting of the solid proceeds rapidly and smoothly, without the development of foam.

*Example II*

A submerged combustion burner similar to that shown in FIGURE 3 is operated at a rate of 200,000 B.t.u./hr. in a cylindrical vertical tank three feet in diameter and six feet deep. An overflow line is located at an elevation of four feet above the base of the tank. The combustion products are released at a depth of three feet below the surface of the molten sulfur. The temperature of the sulfur pool is regulated between 270 to 300° F. Natural gas fuel is burned with air in stoichiometric proportion. The melting rate obtained is determined to be approximately one ton/hr. which is equal to that anticipated from heat and material balance calculations.

*Example III*

A large unit containing three burners as illustrated by FIGURE 3 is employed. The burners are equidistantly spaced in a tank 26 feet long by 6 feet deep by 5 feet wide. An overflow line is located at an elevation of four feet above the bottom. The combustion gases are released at a depth of three feet below the surface. The temperature of the gases discharging from the surface of the liquid is approximately the same as that of the liquid sulfur which is maintained between 238 and 320° F. The melting rate obtained is 30 tons/hr., approximately three times that achieved using steam coils for melting.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:
1. A method of melting solid sulfur comprising maintaining a body of molten sulfur between about 238 and 320° F., introducing hot combustion product gases into and below the surface of the molten sulfur in controlled amounts, adding solid sulfur into the molten sulfur, and withdrawing molten sulfur at about the same rate at which solid sulfur is added.

2. The method according to claim 1 wherein the molten sulfur is maintained at a temperature between about 270° F. and 300° F.

3. A method of melting moist, solid sulfur which reduces foaming and fouling of surfaces comprising maintaining a body of molten sulfur between about 238° F. and 320° F., burning stoichiometric quantities of air and fuel to form hot combustion product gases, introducing said hot combustion product gases into and below the surface of said body of molten sulfur whereby thorough agitation of the molten sulfur results and the heat of the combustion product gases is absorbed by the molten sulfur and the combustion product gases are cooled to about the temperature of said body of molten sulfur, adding solid sulfur, said solid sulfur being of such a size as to be readily meltable by the molten sulfur, and withdrawing molten sulfur at about the same rate at which solid sulfur is added.

References Cited
UNITED STATES PATENTS

| 1,718,334 | 6/1929 | Crawley | 23—293 |
| 1,928,099 | 9/1933 | Gillett | 23—278 |
| 1,983,399 | 12/1934 | Ramsburg | 23—224 |
| 2,086,902 | 7/1937 | Doennecke | 159—16 |
| 2,149,373 | 3/1939 | Vincent | 23—308 |
| 2,373,359 | 4/1945 | Voogd | 23—307 |
| 2,468,455 | 4/1949 | Metziger | 159—16 |
| 2,622,007 | 12/1952 | Allen | 23—278 |
| 2,629,133 | 2/1953 | Moringstan | 23—224 |
| 2,637,630 | 5/1953 | Houston | 23—278 |
| 2,653,077 | 9/1953 | Ogilvie | 159—16 |
| 2,773,545 | 12/1956 | Petersen | 159—16 |
| 2,807,522 | 9/1957 | Russell | 23—278 |
| 3,102,792 | 9/1963 | Eads et al. | 23—308 |

NORMAN YUDKOFF, *Primary Examiner.*

G. P. HINES, *Assistant Examiner.*